US006983399B2

(12) United States Patent
Dochez et al.

(10) Patent No.: US 6,983,399 B2
(45) Date of Patent: Jan. 3, 2006

(54) SYSTEM AND METHOD FOR ASCERTAINING PUBLIC APPLICATION PROGRAM INTERFACE COVERAGE

(75) Inventors: Jerome Dochez, Sunnyvale, CA (US); Carla V. Mott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 768 days.

(21) Appl. No.: 10/016,834

(22) Filed: Dec. 12, 2001

(65) Prior Publication Data

US 2003/0110313 A1  Jun. 12, 2003

Related U.S. Application Data

(60) Provisional application No. 60/337,077, filed on Dec. 6, 2001.

(51) Int. Cl.
*G06F 11/00* (2006.01)
(52) U.S. Cl. ........................................................ 714/38
(58) Field of Classification Search ................ 714/38, 714/37; 719/328, 329; 717/124, 130, 128
See application file for complete search history.

(56) References Cited

U.S. PATENT DOCUMENTS 6,523,169 B1 * 2/2003 Glunz ........................ 717/124
6,601,018 B1 * 7/2003 Logan ........................ 702/786
6,604,209 B1 * 8/2003 Grucci et al. ................. 714/38
6,651,186 B1 * 11/2003 Schwabe ...................... 714/38
6,766,477 B2 * 7/2004 Grucci et al. ................. 714/38

OTHER PUBLICATIONS

Offutt et al, "An Analysis Tool For Couplin-based Integration Testing", Engineering of Complex Computer Systems, 2000. ICECCS 2000. Proceedings: Sixth IEEE International Conference on Sep. 11-14, 2000. pp. 172-178.*

* cited by examiner

*Primary Examiner*—Nadeem Iqbal
*Assistant Examiner*—Timothy M. Bonura
(74) *Attorney, Agent, or Firm*—Martine Penilla & Gencarella, LLP

(57) ABSTRACT

An invention is provided for a computer program embodied on a computer readable medium for ascertaining public API coverage for a J2EE application. The computer program includes a code segment that analyzes an API for an application to determine the plurality of methods comprising the API, and a code segment that intercepts method calls utilizing stubs for corresponding methods of the plurality of methods comprising the API. In addition, the computer program includes a code segment that generates list of intercepted methods calls, and a code segment that compares the list of intercepted methods calls with the plurality of methods comprising the API.

12 Claims, 9 Drawing Sheets

SYSTEM AND METHOD FOR ASCERTAINING PUBLIC APPLICATION PROGRAM INTERFACE COVERAGE

CROSS REFERENCE TO RELATED APPLICATIONS

This application claims the benefit of U.S. Provisional Patent Application having Ser. No. 60/337,077, filed on Dec. 6, 2001, entitled "System and Method for Ascertaining Public Application Program Interface Coverage," which is hereby incorporated by reference.

BACKGROUND OF THE INVENTION

1. Field of the Invention

This invention relates generally to software testing, and more particularly to public application program interface (API) test coverage in a Java programming environment.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks that must be performed by an application programmer, including memory management and cross-platform porting. In this manner, the Java programmer can better focus on design and functionality issues.

One particular Java environment is the Java 2 platform, Enterprise Edition (J2EE), which facilitates building Web-based and enterprise applications. J2EE defines a standard for developing multitier enterprise applications, which simplifies enterprise applications by basing them on standardized, modular components, providing a complete set of services to those components, and handling many details of application behavior automatically, without complex programming.

J2EE takes advantage of many features of the Java 2 Platform, Standard Edition, such as "Write Once, Run Anywhere™" portability, JDBC™ application program interface (API) for database access, CORBA technology for interaction with existing enterprise resources, and a security model that protects data even in Internet applications. Building on this base, Java 2 Enterprise Edition adds full support for Enterprise JavaBeans™ components, Java Servlets API, JavaServer Pages™ and XML technology. The J2EE standard includes complete specifications and compliance tests to ensure portability of applications across the wide range of existing enterprise systems capable of supporting J2EE.

Broadly speaking, J2EE can be conceptually divided into two areas, namely, application servers and applications. FIG. 1 is a logical diagram showing a conventional J2EE space 100. The J2EE space 100 includes applications servers 108a–108c, and applications 106a–106b, which execute on the applications servers 108a–108c. The application servers 108a–108c are essentially large blocks of software developed by individual developers that provide services for applications written to execute in their environment, thus simplifying application development. The applications 106a–106b are smaller, less complex software applications that execute within the application servers 108a–108c. Since many of the services needed by the applications 106a–106b are available through the application servers 108a–108c, application development is simplified and the application code can be less complex.

Further, the applications servers 108a–108c theoretically provide portability to the applications 106a–106b, which allows any application 106a–106b to execute on any application server 108a–108c. For example, a properly developed application 106a should be capable of executing on both application servers 108a and 108b with little or no change in the code of application 106a. However, not all applications 106a–106b are developed to provide adequate portability.

FIG. 2 is a logical diagram showing an exemplary prior art J2EE application 106. The exemplary prior art J2EE application 106 includes a web application 206 in communication with a remote browser 208, and an Enterprise Java Bean (EJB) bundle 200 in communication with an application client 210, which can also be remotely located. The web application 206 facilitates communication via the Internet with a browser 208. Typically, the browser 208 sends hypertext transfer protocol (HTTP) based data to the web application 206, which responds with hypertext markup language (HTML). In this manner, the web application 206 can provide static content such as standard web pages. In addition, the web application 206 can provide dynamic content, such as a bank statement, using Java servlets and JavaServer pages (JSPs).

The J2EE application 106 further includes an EJB bundle 200, which comprises a plurality of EJBs 202. The J2EE specifications define how applications should be written for the J2EE environment. Thus the specifications provide the contract between the applications and the J2EE platform. One aspect of the J2EE specification is the EJB 2.0 Container Managed Persistence (CMP). The EJB 2.0 specification defines a contract between an entity bean, its container and the persistence manager for the management of persistent state and relationships for the entity beans. For a complete specification of CMP, refer to the EJB 2.0 specification published by Sun Microsystems, Inc., which is incorporated by reference herein in its entirety.

According to the EJB programming model, a bean provider develops a set of EJBs 202 for an application and specifies the relationships between these objects. More specifically, each EJB 202 includes a public application program interface (API) 204, which provides an interface to that EJB 202. Each API 204 is an interface comprising a plurality of methods that can be called by an application client 210 to interface with the particular EJB 202. For example, an EJB for customer service may include within the API a method to determine an individual's credit limit. The application client 210 can then call the method using appropriate parameters, and the EJB 202 will process the method call. In addition to the application client 210, other EJBs 202 can interface with a particular EJB 202 via its public API 204, as can web applications 206.

As mentioned above, application servers are developed by individual application server developers, such as International Business Machines (IBM) and Oracle. As such, many different application servers are currently available for use in executing J2EE application. Although, all application servers are designed to allow portability of J2EE applications, many application servers include special services that are not available on other application servers. As a result, J2EE applications that are designed to utilize the special services of a particular application server generally lose portability, since the special service may not be available on a different application server. Thus, it is desirable to know the portability of a particular J2EE application so that a user can determine the extent to which the product is tied to a particular application server. However, it is difficult to ascertain the portability of a product in a standard manner that can be independently verified.

In view of the forgoing, there is a need for methods that can determine the portability of a particular J2EE application in a standard manner that can be independently verified. The methods should be automated to reduce operator error, and allow portability testing without regard to the actual functionality of the J2EE application.

SUMMARY OF THE INVENTION

Broadly speaking, the present invention fills these needs by providing systems and methods to ascertain the public API coverage of a J2EE application to determine the portability of the application program. In one embodiment, a method for ascertaining API coverage for a J2EE application is disclosed. An API of an application is analyzed to determine the plurality of methods comprising the API. The API is exercised utilizing a test program, which in one embodiment can be provided by an application vendor, that calls methods from the plurality of methods comprising the API, and a list of methods called by the test program is generated. The list of methods called by the test program is then compared with the plurality of methods comprising the API.

In another embodiment, a computer program embodied on a computer readable medium for ascertaining API coverage for a J2EE application is disclosed. The computer program includes a code segment that analyzes the API for an application to determine a plurality of methods comprising the API, and a code segment that intercepts method calls utilizing stubs for corresponding methods of the plurality of methods comprising the API. In addition, the computer program includes a code segment that generates list of intercepted methods calls, and a code segment that compares the list of intercepted methods calls with the plurality of methods comprising the API.

A system for ascertaining API coverage for a J2EE application is disclosed in a further embodiment of the present invention. The system includes logic that analyzes an API for an application to determine a plurality of methods comprising the API. Further included is logic that generates a list of methods called by a test program, and logic that compares the list of methods called by the test program with the plurality of methods comprising the API. This comparison determines a percentage of the plurality of methods comprising the API that are called by the test program. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a method for ascertaining public application program interface coverage to determine the portability of a J2EE application. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
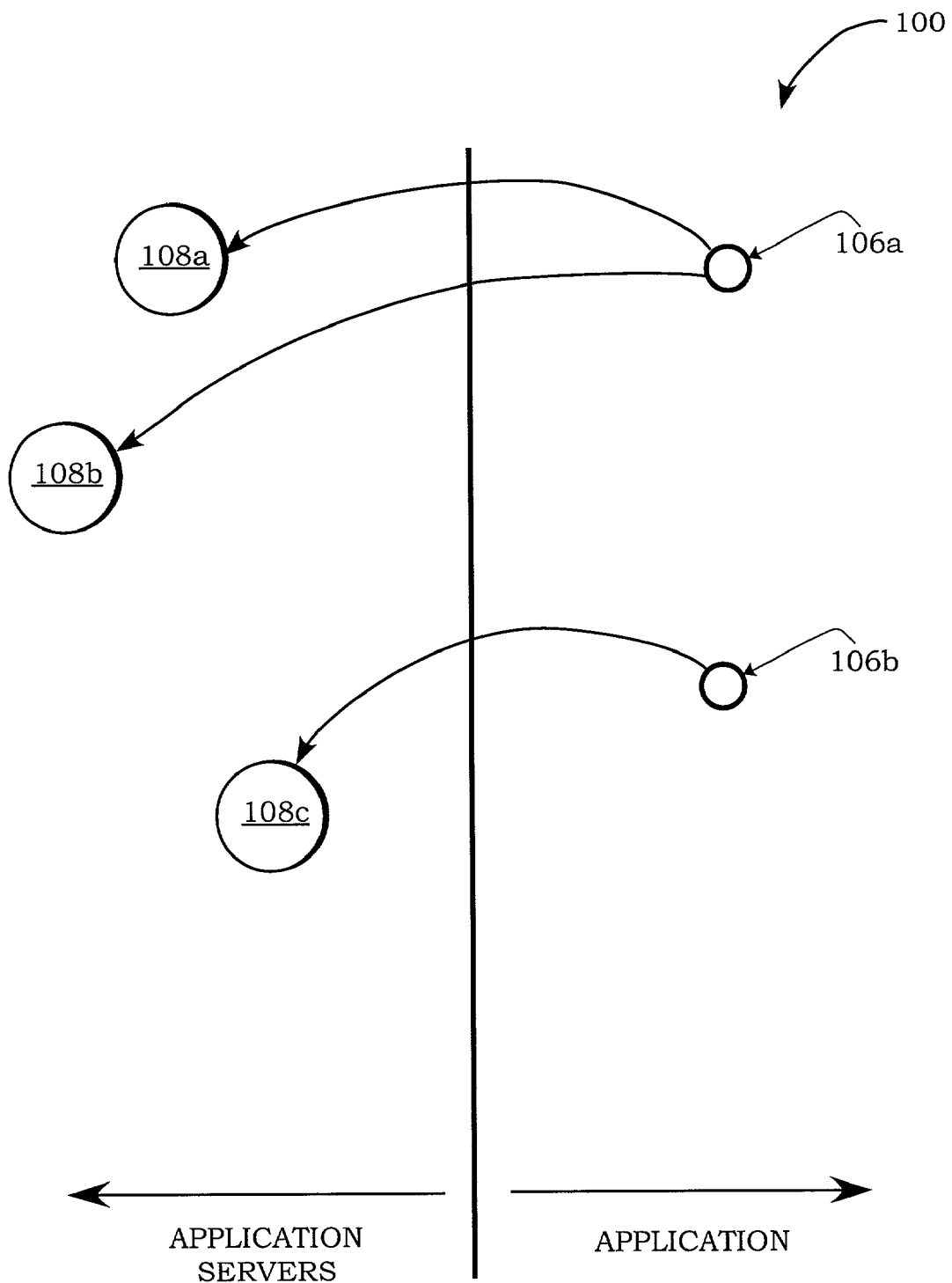
FIG. 1 is a logical diagram showing a conventional J2EE space.
Figure 2:
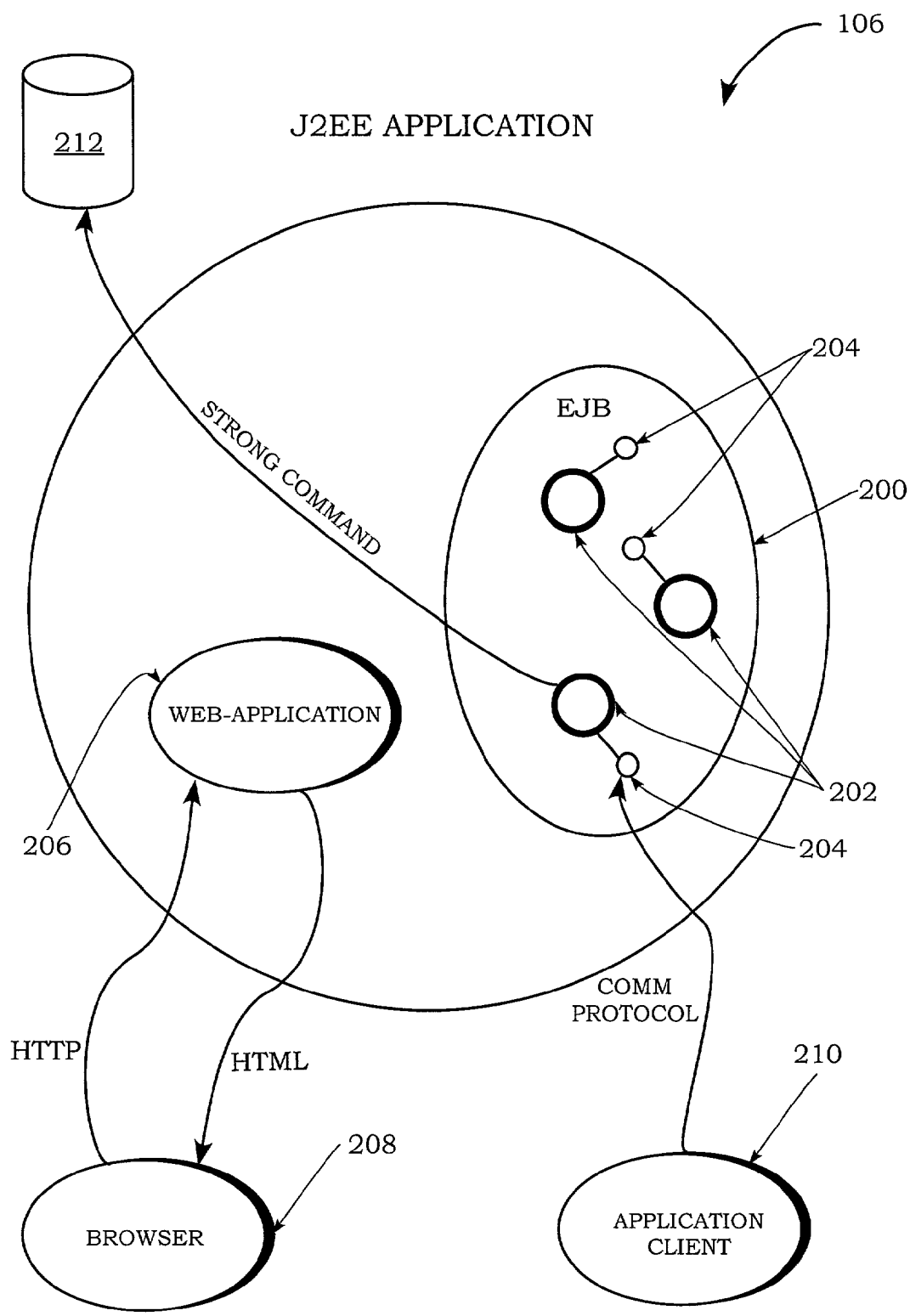
FIG. 2 is a logical diagram showing an exemplary prior art J2EE application.
Figure 3:
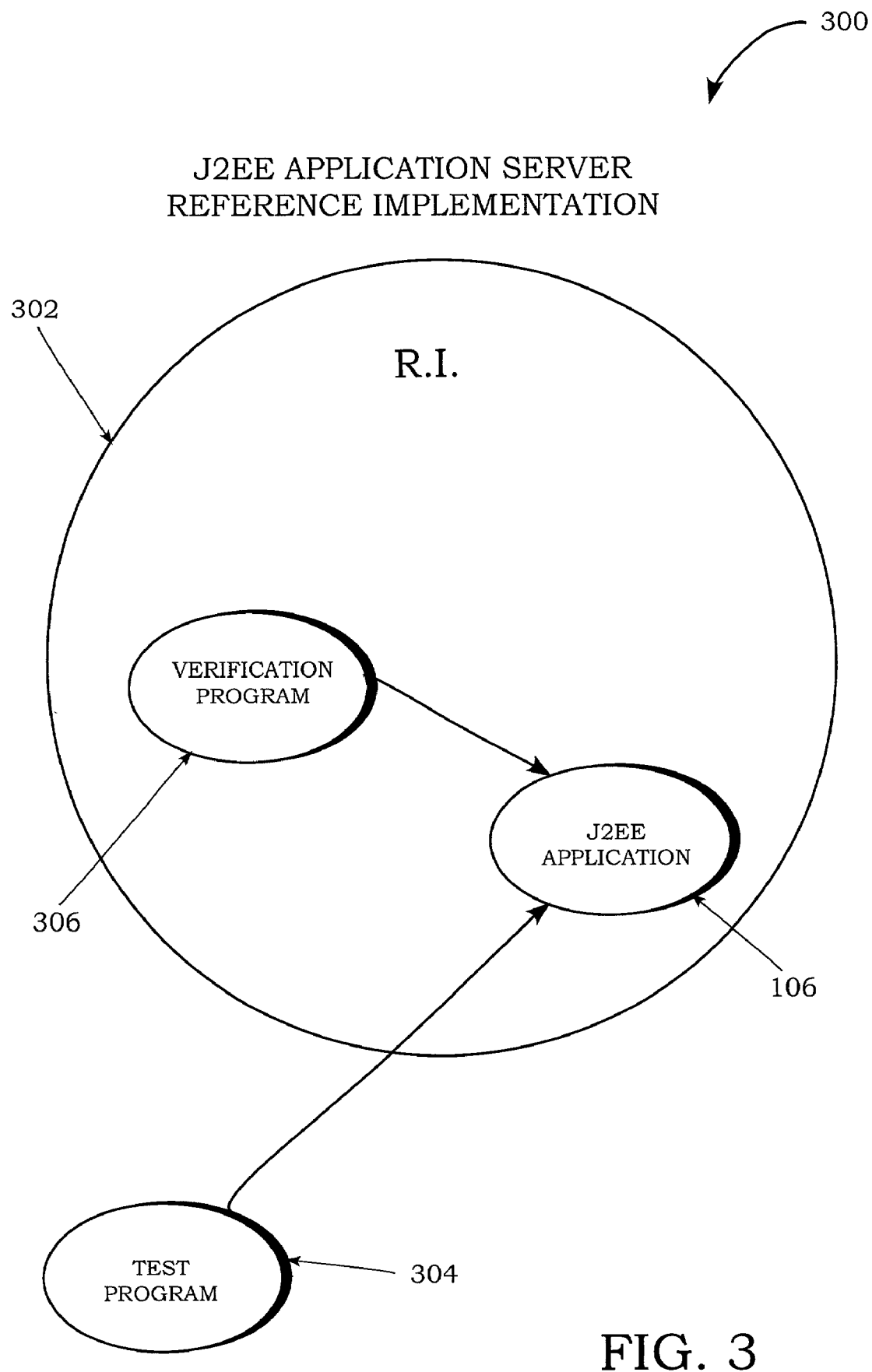
FIG. 3 is a logical diagram showing a public API coverage test configuration, in accordance with an embodiment of the present invention.

FIGS. 1 and 2 were described in terms of the prior art. FIG. 3 is a logical diagram showing a public API coverage test configuration 300, in accordance with an embodiment of the present invention. The public API coverage test configuration 300 shows a J2EE application 106 and a verification program 306 both executing on a J2EE application server reference implementation 302. The J2EE application server reference implementation 302 is an implementation of the J2EE application server specification developed by SUN MICROSYSTEMS. One purpose of the reference implementation 302 is to validate the specifications. That is, to prove that the specifications can be implemented. In addition, the J2EE application server Reference Implementation 302 is designed to validate test suites and to be clearly understandable to vendors who want to examine an exemplary implementation of a specific specification.

Further, the J2EE application server Reference Implementation 302 does not include any special services that may be included on other commercially available J2EE application servers developed by private developers outside of SUN MICROSYSTEMS. As a result, J2EE applications that can execute properly on the J2EE application server Reference Implementation 302 will be portable to other J2EE application servers. Conversely, J2EE applications that rely heavily on the special services of a particular privately developed J2EE application server, generally will not execute properly on the J2EE application server Reference Implementation 302, since calls to non-exist special services will generate errors. Although an application developer could simply avoid exercising those methods that utilize the special services of a particular J2EE application server, as will be seen subsequently embodiments of the present invention can detect this reduced method call coverage and can designate the application as non-portable if appropriate.

In operation, the J2EE application 106 is deployed on the J2EE application server reference implementation 302 and exercised using a test program 304, which exercises the J2EE application 106 by calling the public API methods of the J2EE application 106. In one embodiment, the developer of the J2EE application 106 can create the test program 304, since the developer is aware of the particular methods included in the public API of the J2EE application 106. In this manner, the verification program 306 can record the API coverage of the J2EE application 106 without regard as to the specific configuration of the API or the specific functionality of the J2EE application 106.

During execution of the test program 304 and J2EE application 106, the verification program 306 tracks the execution of the J2EE application 106, and records information regarding the execution. Broadly speaking, the verification program 306 analyzes the J2EE application 106 to determine the methods comprising each public API of the J2EE application 106. During execution of the test program 304 and J2EE application 106, the verification program 306 records the method calls performed. Upon completion of the test program 304, the verification program 306 compares the methods that were called during the test with the methods that comprise the public API of the J2EE application 106 to quantify the portability of the J2EE application 106. Hence, embodiments of the present invention can verify application portability through introspection, instrumentation, and reconciliation, as described next with reference to FIG. 4.

Figure 4:
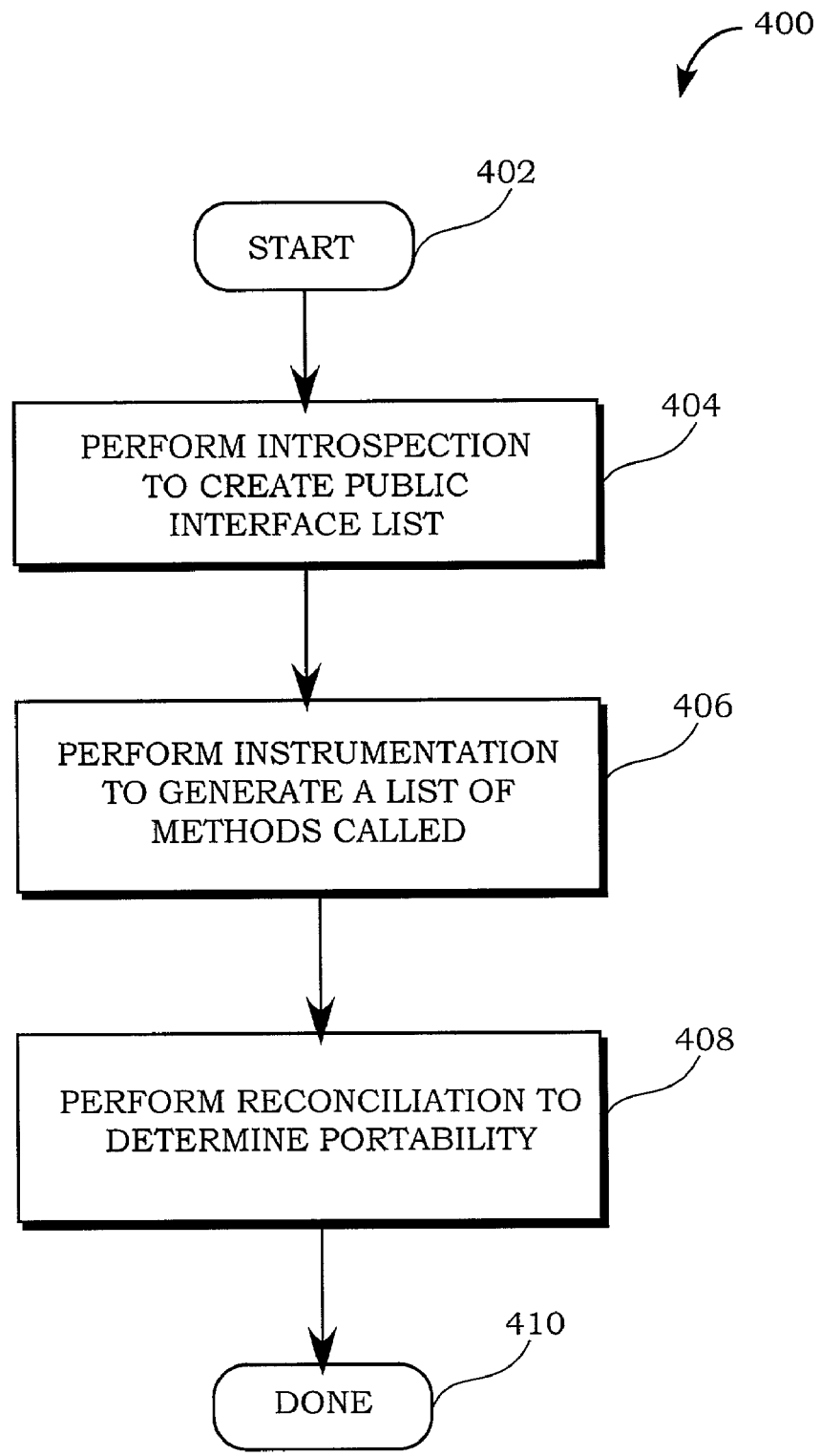
FIG. 4 is a flowchart showing a method for ascertaining API coverage for a J2EE application, in accordance with an embodiment of the present invention.

FIG. 4 is a flowchart showing a method 400 for ascertaining API coverage for a J2EE application, in accordance with an embodiment of the present invention. In an initial operation 402 preprocess operations are performed. Preprocess operations can include developing a test program for the J2EE application, deploying the J2EE application on the J2EE application server reference implementation, and other preprocess operations that will be apparent to those skilled in the art.

In operation 404, introspection is performed to create a public interface list. In order to ensure proper public API coverage of a J2EE application, embodiments of the present invention collect information from the components and interfaces of the J2EE application through introspection. As used herein introspection refers to examining a software component to determine the capabilities of the software component. Hence, in operation 404 the public APIs of the J2EE application are examined to determine the methods available in the public APIs and create a list of these public API methods. Because embodiments of the present invention perform introspection to determine the methods available in the public APIs of the J2EE application, embodiments of the present invention do not need to be aware of the actual methods available or the functionality of the J2EE application prior to testing. In this manner, the portability testing of the embodiments of the present invention can be automated.

In operation 406, instrumentation is performed to generate a list of methods called. Once components are executing in the J2EE application server reference implementation, the embodiments of the present invention record all public API calls made to the J2EE application during testing. In addition, all exceptions generated during testing are also tracked in the instrumentation to ensure correct behavior of the J2EE application during the public API execution. In addition, an embodiment of the present invention also records the number of times each particular method of the API is called during the test.

Reconciliation is performed to determine the API coverage and hence the portability of the J2EE application, in operation 408. In operation 408, the results of the introspection and the instrumentation are utilized to determine the public API coverage for the J2EE application. The calculation is based on comparing the public interface list created via introspection in operation 404 with the list of methods called generated through instrumentation in operation 406. As described in greater detail below, this calculation provides an actual percentage of the exercised public API verses the total public API of the J2EE application.

Post process operations are performed in operation 410. Post process operations can include further J2EE application testing and other post process operations that will be apparent to those skilled in the art. Hence, using the embodiments of the present invention the portability of a particular J2EE application can be determine in a standardized manner that can be independently verified. Further, the embodiments of the present invention can be automated to reduce operator error, and allow portability testing without regard to the actual functionality of the J2EE application.

Figure 5:
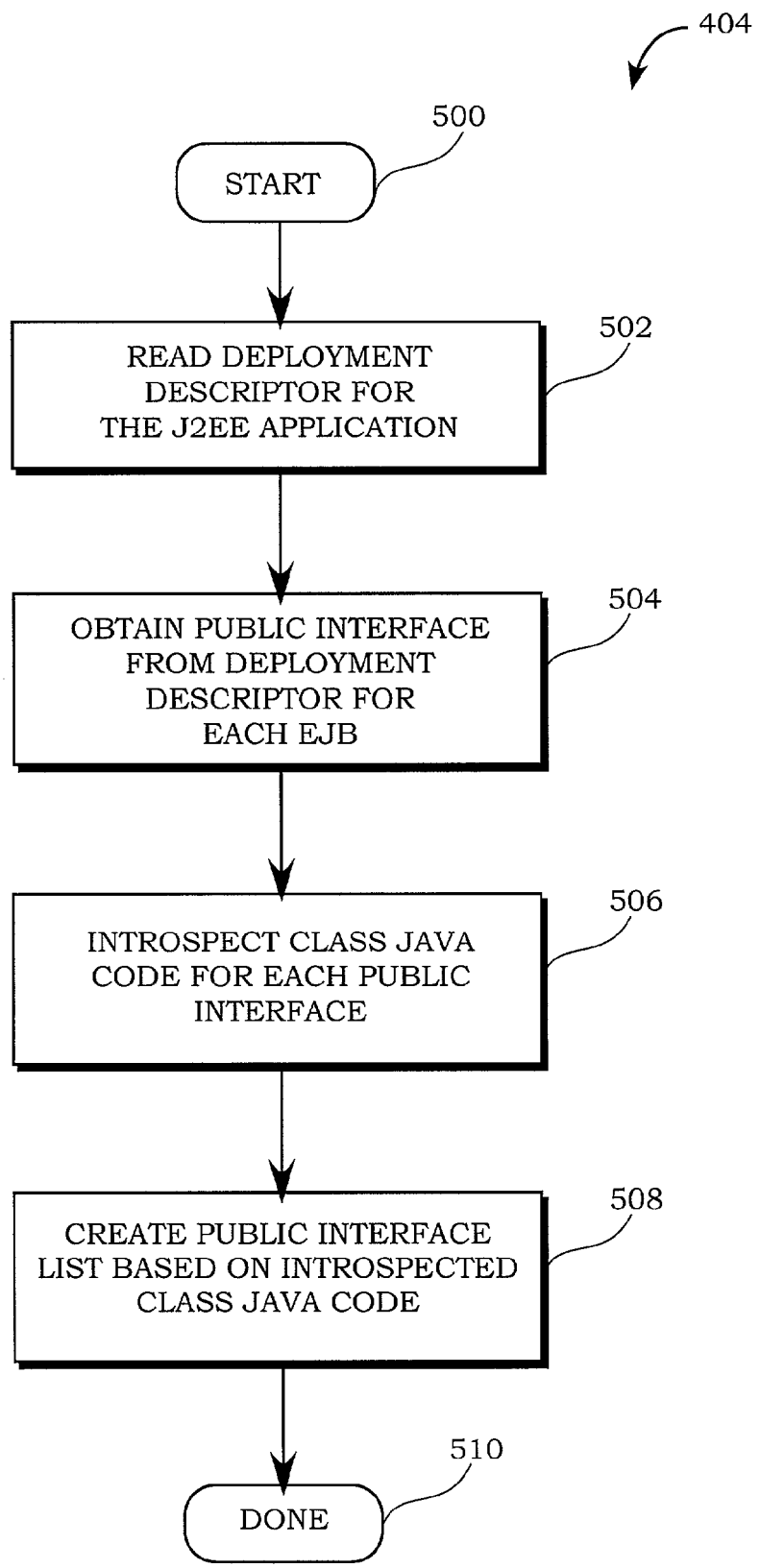
FIG. 5 is a flowchart showing a method for performing introspection on a J2EE application to create a public interface list, in accordance with an embodiment of the present invention.

FIG. 5 is a flowchart showing a method 404 for performing introspection on a J2EE application to create a public interface list, in accordance with an embodiment of the present invention. In an initial operation 500, preprocess operations are performed. Preprocess operations can include deploying the J2EE application on the J2EE application server reference implementation, and other preprocess operations that will be apparent to those skilled in the art.

Figure 6A:
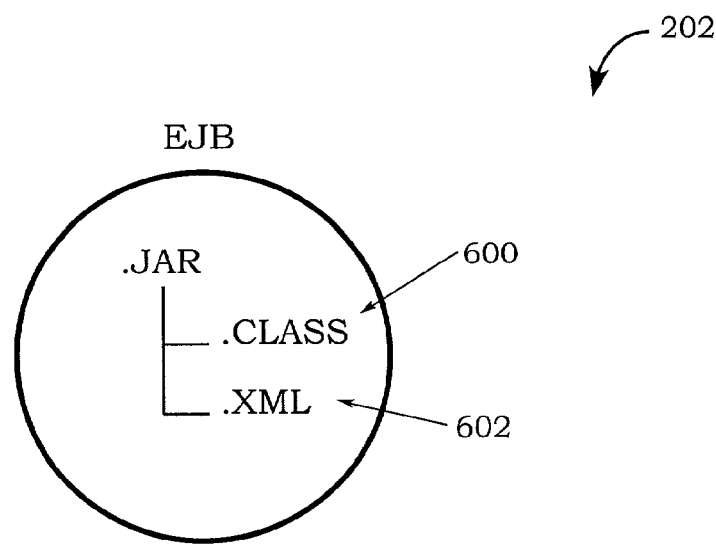
FIG. 6A is an illustration showing an exemplary EJB.

In operation 502, the deployment descriptor for the J2EE application is read. Each J2EE application, web application, EJB bundle, and each EJB is defined both by code and by deployment descriptors. FIG. 6A is an illustration showing an exemplary EJB 202. As mentioned above, an EJB typically comprises Java code 600 and deployment descriptors 602, which are typically defined in extensible markup language (XML). The deployment descriptors 602 provides information about the EJB 202, such as what the EJB 202 does, the name of the component, and the capabilities of the component. In addition, deployment descriptors 602 can define the security for the EJB 202, such as whether the EJB 202 is protected, and if protected, the identities of those who have access, and the passwords of those who have access. The deployment descriptors 602 allow certain characteristics of the EJB 202 to be changed without having to change the Java code 600. For example, the list of individuals having access to the EJB 202 can be updated using the deployment descriptor 602 without having to change the Java code 600.

Figure 6B:
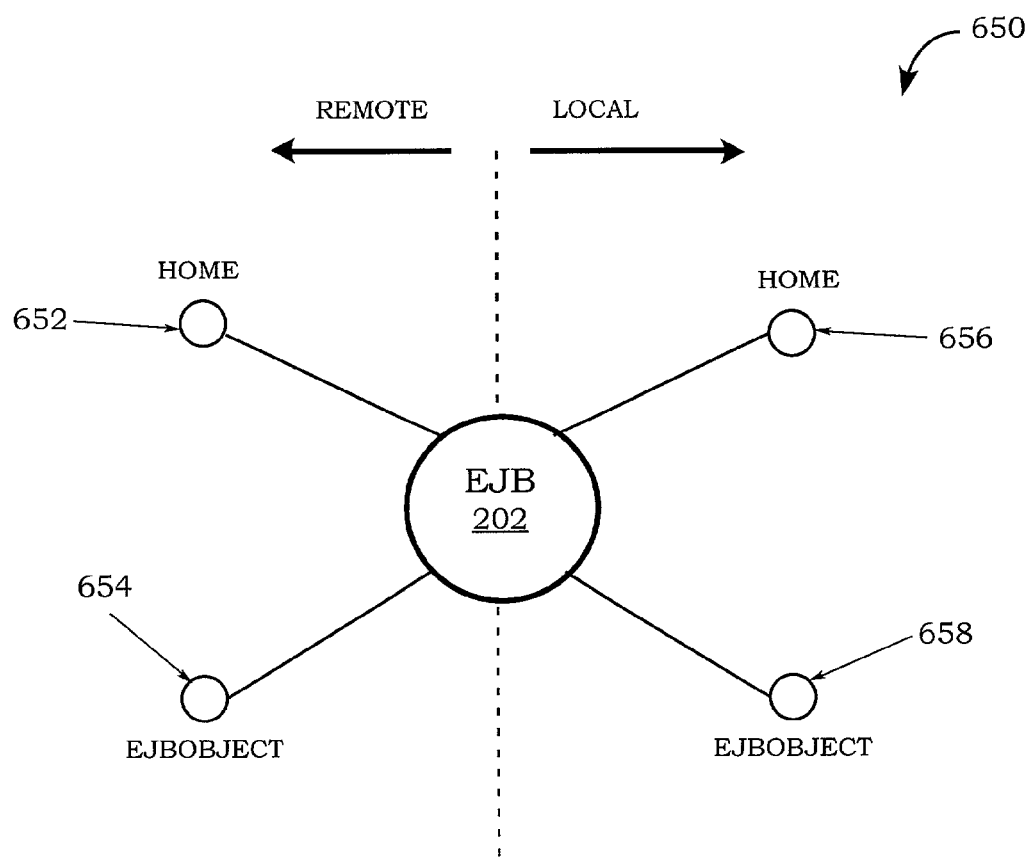
FIG. 6B is a diagram showing EJB public interfaces.

Referring back to FIG. 5, for each EJB comprising the J2EE application, the public interfaces for each EJB are obtained from the deployment descriptor. FIG. 6B is a diagram showing EJB public interfaces 650. As shown in FIG. 6B, each EJB 202 typically has two or four public interfaces. More specifically, the exemplary EJB 202 can include a remote home public interface 652, remote EJBobject public interface 654, local home public interface 656, and local EJBobject public interface 658. Generally, an EJB 202 will include either the remote public interfaces 652 and 654, the local public interfaces 656 and 658, or both the remote and local interfaces.

The remote and local home interfaces 652 and 656 are essentially utilized to create instances of the EJB 202, and to perform other EJB 202 maintenance operations. For example, an EJB 202 for customer service may include a method to create a new customer. The remote and local EJBObject interfaces 654 and 658 are utilized to operate with a particular instance of the EJB 202. For example, once a customer is created using a method from the home interface, an account can be entered for the particular customer using the EJBObject interface. In addition, the remote and local interfaces can be used to optimize the EJB 202. For example, if remote access is not required for a particular EJB 202, the EJB 202 can include just the local public interfaces 656 and 658.

Referring back to FIG. 5, the Java code for each public interface is introspected, in operation 506. In operation 506, embodiments of the present invention examine the Java code comprising each public interface obtained in operation 504 to ascertain the methods comprising each public interface. In this manner, embodiments of the present invention can determine which methods are available in each public API and the method call configurations, such as the method parameters and return type.

A public interface list is created based on the introspected class Java code, in operation 508. In one embodiment, the public interface list can be an XML file. XML is an open standard for describing data and is often used for defining data elements on a Web page and business-to-business documents. XML uses a similar tag structure as HTIML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function like database records.

An XML document primarily comprises a strictly nested hierarchy of elements with a single root. Elements can contain character data, child elements, or a mixture of both. In addition, they can have attributes. Child character data and child elements are strictly ordered, while attributes are not. The names of the elements and attributes and their order in the hierarchy (among other things) form the XML markup language used by the document, also known as the "validity" of the document.

Thus, using an XML based public API list, embodiments of the present invention can utilize the list for instrumentation, described in greater detail subsequently. Moreover, the XML based public API list can be utilized by other applications for further analysis of the J2EE application API, since the XML based public API can be processed by other applications that can process XML.

Post process operations are performed in operation 508. Post process operations can include performing instrumentation of the J2EE application, calculating the API coverage of the J2EE application, and other post process operation that will be apparent to those skilled in the art after a careful reading of the present disclosure. It should be noted that introspection and instrumentation, described below with reference to FIG. 7, can be performed independently. That is, the operations are not dependent on the order in which they are performed.

Figure 7:
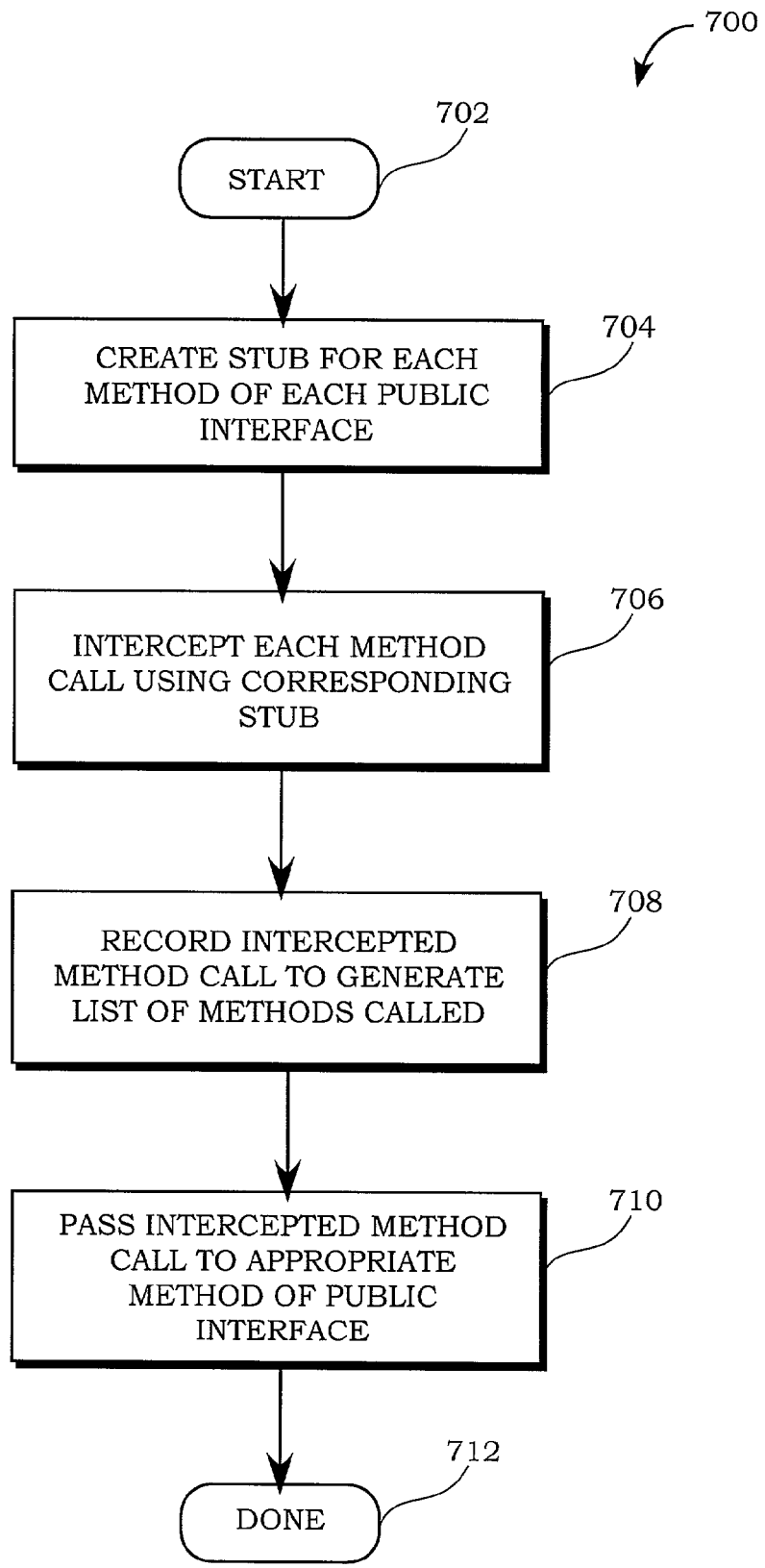
FIG. 7 is a flowchart showing a method for performing instrumentation on a J2EE application, in accordance with an embodiment of the present invention.

FIG. 7 is a flowchart showing a method 700 for performing instrumentation on a J2EE application, in accordance with an embodiment of the present invention. In an initial operation 702, preprocess operations are performed. Preprocess operations can include deploying the J2EE application on the J2EE application server reference implementation, create a public interface list via introspection, and other preprocess operations that will be apparent to those skilled in the art after a careful reading of the present disclosure.

In operation 704, stubs are created for each method of each public interface. A stub is a small software routine placed into a program that provides a common function. Embodiments of the present invention create a stub that corresponds to each method of each public interface. Each stub has the same signature as the corresponding method of the public API, and as such can be used to intercept calls to the API method by mimicking the corresponding method of the public API, as described next with reference to FIG. 8.

Figure 8:
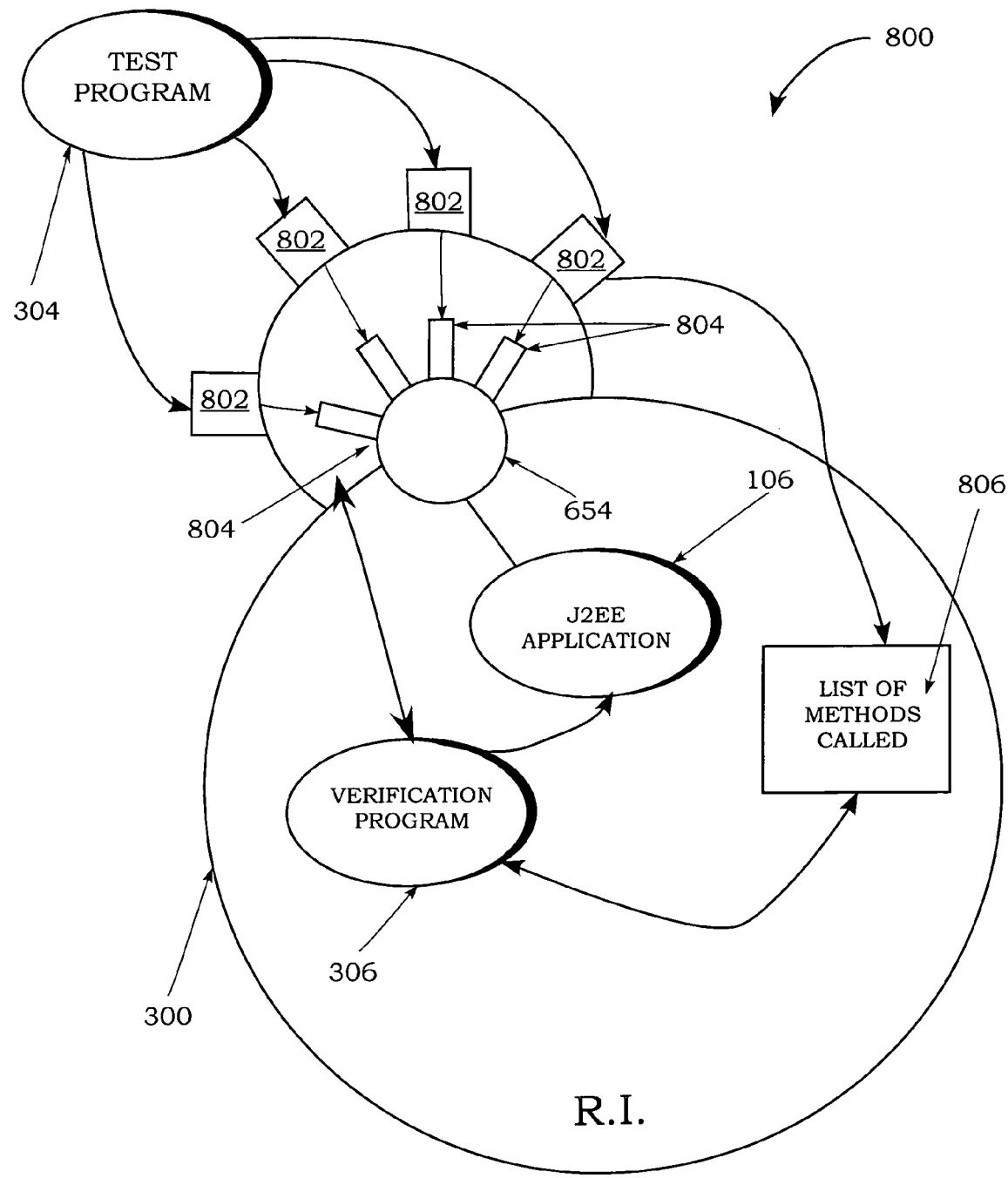
FIG. 8 is a logical diagram showing an instrumentation implementation for detecting method calls to a J2EE application, in accordance with an embodiment of the present invention.

FIG. 8 is a logical diagram showing an instrumentation configuration 800 for detecting method calls to a J2EE application, in accordance with an embodiment of the present invention. As shown in FIG. 8, the J2EE application 106 having a public API 654 is executed on a J2EE application server reference implementation 300. As mentioned previously, each public API 654 includes a plurality of public methods 804 that can be called by the test program 304 during application testing. Embodiments of the present invention further deploy a verification program 306 that analyzes the J2EE application 106 to determine the public APIs present in the J2EE application 106, such as the API 654. For each public method 804 comprising the public API 654, embodiments of the present invention create a stub 802 having the same signature as the corresponding public method 804 of the public API 654.

Referring back to FIG. 7, each method call from the test program is intercepted using the corresponding stub, in operation 706. Once the stubs are created, the J2EE application is exercised using the test program. As shown in FIG. 8, the test program 304 exercises the J2EE application 106 by calling the methods 804 that comprise the public interface 654 of the J2EE application 106. As each method 804 is called, the method call is intercepted using the corresponding stub 802. In this manner, a verification program of the embodiments of the present invention can form a software layer around the pubic API 654 of a J2EE application 106 to better control the flow of test information.

Turning back to FIG. 7, each intercepted method call is recorded to generate a list of methods called, in operation 708. Referring to FIG. 8, as each stub 802 intercepts a method call from the test program 304, the intercepted method call is recorded in a list of the methods called 806. The list of the methods called 806 can be in computer memory, disk storage, or stored using some other medium that can later be referred to by the verification program 306. In this manner, embodiments of the present invention can determine which public methods 804 of the public API 654 are called during the execution of the test program 304, without needing to affect the code of the test program 304 or the J2EE application 106.

Referring to FIG. 7, the intercepted method calls are passed to the appropriate method of the public API, in operation 710. As shown in FIG. 8, each intercepted method call from the test program 304 is passed to the appropriate method 804 of the public API 654 allowing the J2EE application 106 to respond accordingly. In this manner, embodiments of the present invention can perform instrumentation for the J2EE application 106 in a transparent manner, without needing to affect the code of the test program 304 or the J2EE application 106. In addition, the verification program 306 records any exceptions raised by the J2EE application 106 in response to the passed method calls. Hence, the verification program 306 is aware of any problems arising as a result of the J2EE application test.

Turning back to FIG. 7, post process operations are performed in operation 712. Post process operations can include reconciling the API coverage of the J2EE application, further J2EE application test analysis, and other post process operations that will be apparent to those skilled in the art after a careful reading of the present disclosure. Once the list of methods called is generated, embodiments of the present invention can determine the API coverage of the J2EE application, as described next with reference to FIG. 9.

Figure 9:
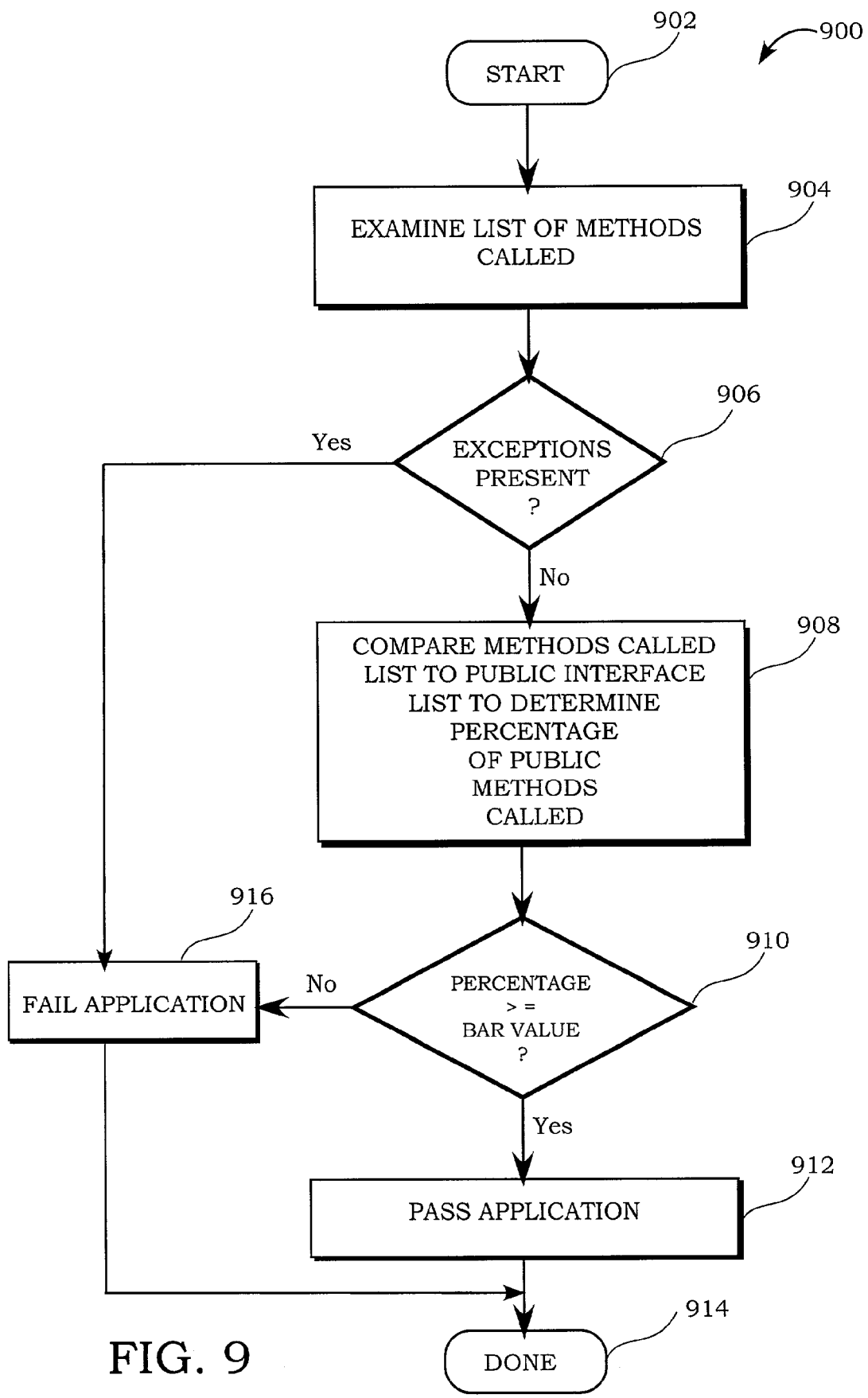
FIG. 9 is a flowchart showing a method for performing reconciliation to determine portability of a J2EE application, in accordance with an embodiment of the present invention.

FIG. 9 is a flowchart showing a method 900 for performing reconciliation to determine portability of a J2EE application, in accordance with an embodiment of the present invention. In an initial operation 902, preprocess operations are performed. Preprocess operations can include performing introspection to determine the available methods of the public APIs, performing instrumentation to determine the methods called during testing, and other preprocess operations that will be apparent to those skilled in the art after a careful reading of the present disclosure.

In operation 904, the list of methods called is examined. As mentioned above, embodiments of the present invention perform instrumentation to determine which methods of the public API are called by the test program during testing. In operation 904, the list of methods called is examined to determine which methods of the public API were called and whether any exceptions occurred during testing.

A decision is made as to whether any exceptions have been recorded, in operation 906. An exception indicates a problem has occurred during testing. As such, the test should fail until the problem is resolved. Hence, if any exceptions have been recorded, the J2EE portability verification is failed in operation 916. Otherwise, the method 900 continues to operation 908.

In operation 908, the list of methods called is compared to the public interface list to determine the percentage of the public API called during testing. As discussed previously, embodiments of the present invention perform introspection to ascertain the methods of the public API of the J2EE application under test. In operation 908, the list of methods called is compared to the methods of the public API of the J2EE application under test. A calculation is then performed to determine the percentage of the methods comprising the public API that were called by the test program during testing. Among other factors, this percentage can indicate the percentage of the public API of the J2EE application that is portable.

A decision is then made as to whether the percentage is greater than a predefined bar percentage, in operation 910. The bar percentage is a percentage that determines the minimum percentage of the methods of the public API that should be exercised by the test program without raising exceptions. If the percentage is greater than the predefined bar percentage, the method 900 continues with operation 912. Otherwise, the method 900 branches to failure operation 916.

In operation 912, the J2EE application is designated as portable. When the percentage the methods of public API successfully exercised is greater than the predefined bar percentage, the J2EE application can be designated as portable. For example, if the bar percentage is 80%, the J2EE application can be considered portable if 80% of the methods of the public API are successfully exercised.

In operation 916, the J2EE application is designated as non-portable. As shown in FIG. 9, a J2EE application can be designated as non-portable for two reasons. First, an exception can occur during testing indicating a problem with the J2EE application. As such, the test will fail. Second, the percentage of the methods of public API successfully exercised can be less than the predefined bar percentage. This situation can occur, for example, because the J2EE application relies heavily on specialized services provided by a particular application server implementation, or because the test program only exercised a small percentage of the public API. In either case, the J2EE application should be designated as non-portable because adequate public API coverage has not been demonstrated. Post process operations are performed in operation 914. Post process operations can include further J2EE test analysis, and other post process operations that will be apparent to those skilled in the art.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for ascertaining application program interface (API) coverage for a Java 2 platform Enterprise Edition (J2EE) application, comprising the operations of:

analyzing an API of an application to determine a plurality of methods comprising the API;

exercising the API utilizing a test program that calls methods from the plurality of methods comprising the API;

generating a list of methods called by the test program; and comparing the list of methods called by the test program with the plurality of methods comprising the API; and determining a percentage of the plurality of methods comprising the API that are called by the test program and designating the application as portable when the percentage is greater than a predetermined bar percentage.

2. A method as recited in claim 1, further comprising the operation of designating the application as non-portable when the percentage is less than the predetermined bar percentage.

3. A method for ascertaining application program interface (API) coverage for a Java 2 platform Enterprise Edition (J2EE) application, comprising the operations of:

analyzing an API of an application to determine a plurality of methods comprising the API;

exercising the API utilizing a test program that calls methods from the plurality of methods comprising the API;

generating a list of methods called by the test program;

comparing the list of methods called by the test program with the plurality of methods comprising the API;

intercepting method calls from the test program utilizing stubs for corresponding methods of the plurality of methods comprising the API; and recording the intercepted method calls and passing the intercepted method calls to corresponding methods of the plurality of methods comprising the API.

4. A computer program embodied on a computer readable medium for ascertaining application program interface (API) coverage for a Java 2 platform Enterprise Edition (J2EE) application, comprising:

a code segment that analyzes an API for an application to determine a plurality of methods comprising the API;

a code segment that intercepts method calls utilizing stubs for corresponding methods of the plurality of methods comprising the API;

a code segment that generates a list of intercepted methods calls; and a code segment that compares the list of intercepted methods calls with the plurality of methods comprising the API, wherein the method calls are generated by a test program that exercises the application API by calling methods from the plurality of methods comprising the API; and a code segment that determines a percentage of the plurality of methods comprising the API that are called by the test program, wherein the application is designated as portable when the percentage is greater than a predetermined bar percentage.

5. A computer program as recited in claim 4, wherein the application is designated as non-portable when the percentage is less than the predetermined bar percentage.

6. A computer program embodied on a computer readable medium for ascertaining application program interface (API) coverage for a Java 2 platform Enterprise Edition (J2EE) application, comprising:

a code segment that analyzes an API for an application to determine a plurality of methods comprising the API;

a code segment that intercepts method calls utilizing stubs for corresponding methods of the plurality of methods comprising the API;

a code segment that generates list of intercepted methods calls;

a code segment that compares the list of intercepted methods calls with the plurality of methods comprising the API; and a code segment that passes the intercepted method calls to corresponding methods of the plurality of methods comprising the API.

7. A computer program embodied on a computer readable medium for ascertaining application program interface (API) coverage for a Java 2 platform Enterprise Edition (J2EE) application, comprising:

a code segment that analyzes an API for an application to determine a plurality of methods comprising the API;

a code segment that intercepts method calls utilizing stubs for corresponding methods of the plurality of methods comprising the API;

a code segment that generates list of intercepted methods calls;

a code segment that compares the list of intercepted methods calls with the plurality of methods comprising the API; and a code segment that reads a deployment descriptor for the application to determine a public interface for the application.

8. A computer program as recited in claim 7, further comprising a code segment that introspects class Java code for the public interface to generate a list of the plurality of methods comprising the API.

9. A system for ascertaining application program interface (API) coverage for a Java 2 platform Enterprise Edition (J2EE) application, comprising:

logic that analyzes an API for an application to determine a plurality of methods comprising the API;

logic that generates a list of methods called by a test program;

logic that compares the list of methods called by the test program with the plurality of methods comprising the API to determine a percentage of the plurality of methods comprising the API that are called by the test program; and logic that designates the application as portable when the percentage is greater than a predetermined bar percentage.

10. A system as recited in claim 9, wherein the test program exercises the application API by calling methods from the plurality of methods comprising the API.

11. A system as recited in claim 9, further comprising logic that designates the application as non-portable when the percentage is less than the predetermined bar percentage.

12. A system as recited in claim 11, further comprising logic that designates the application as non-portable when an exception occurs during execution of the test program.

* * * * *